(12) United States Patent
Rizvi et al.

(10) Patent No.: US 8,346,712 B2
(45) Date of Patent: *Jan. 1, 2013

(54) METHOD FOR IDENTIFYING HAMMERSTEIN MODELS

(75) Inventors: Syed Z. Rizvi, Dhahran (SA); Hussain N. Al-Duwaish, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 557 days.

This patent is subject to a terminal disclaimer.

(21) Appl. No.: 12/591,604

(22) Filed: Nov. 24, 2009

(65) Prior Publication Data

US 2011/0125685 A1   May 26, 2011

(51) Int. Cl.
*G06F 15/00* (2006.01)
*G06F 15/18* (2006.01)
(52) U.S. Cl. ............... 706/62; 706/45; 706/46; 706/47; 700/28; 700/29; 700/30; 700/47
(58) Field of Classification Search .................. None
See application file for complete search history.

(56) References Cited

U.S. PATENT DOCUMENTS

| | | | | |
|---|---|---|---|---|
| 6,047,221 | A * | 4/2000 | Piche et al. ............ | 700/44 |
| 6,381,504 | B1 * | 4/2002 | Havener et al. ............ | 700/44 |
| 6,487,459 | B1 * | 11/2002 | Martin et al. ............ | 700/44 |
| 6,516,309 | B1 | 2/2003 | Eberhart et al. | |
| 6,950,711 | B2 * | 9/2005 | Havener et al. ............ | 700/28 |
| 7,039,475 | B2 | 5/2006 | Sayyarrodsari et al. | |
| 7,272,454 | B2 | 9/2007 | Wojsznis et al. | |
| 7,395,191 | B2 | 7/2008 | Detwiler et al. | |
| 7,496,414 | B2 * | 2/2009 | Boe et al. ............ | 700/44 |
| 7,885,797 | B2 * | 2/2011 | Koppl et al. ............ | 703/13 |
| 2003/0191406 | A1 | 10/2003 | Eberhart et al. | |
| 2007/0015972 | A1 | 1/2007 | Wang et al. | |
| 2007/0088446 | A1 | 4/2007 | Srinivasan et al. | |
| 2007/0156288 | A1 | 7/2007 | Wroblewski et al. | |
| 2008/0071397 | A1 | 3/2008 | Rawlings et al. | |
| 2008/0166019 | A1 | 7/2008 | Lee | |
| 2008/0293372 | A1 * | 11/2008 | Principe et al. ............ | 455/334 |
| 2009/0030891 | A1 | 1/2009 | Skubacaz et al. | |

OTHER PUBLICATIONS

Lin et al. "A mew identification method for Hammerstein model based on PSO", IEEE, 2006, pp. 2184-2188.*

Liu et al. "Nonlinear system identification of Hammerstein and Wiener model using swarm intelligence", IEEE, 2006, pp. 1219-1223.*

Hou, "Hammerstein model identification based on adaptive particle swarm optimization", Workshop on intelligent information technology application, 2007, pp. 137-140.*

Salahshoor et al., "A new on-line subspace-based identification algorithm for multivariable Hammerstein models", IEEE, 2008, pp. 4748-4753.*

(Continued)

*Primary Examiner* — Omar Fernandez Rivas
(74) *Attorney, Agent, or Firm* — Richard C. Litman

(57) ABSTRACT

The identification of Hammerstein models relates to a computerized method for identifying Hammerstein models in which the linear dynamic part is modeled by a space-state model and the static nonlinear part is modeled using a radial basis function neural network (RBFNN), and in which a particle swarm optimization (PSO) algorithm is used to estimate the neural network parameters and a numerical algorithm for subspace state-space system identification (N4SID) is used for estimation of parameters of the linear part.

5 Claims, 9 Drawing Sheets

OTHER PUBLICATIONS

Kennedy et al. "Particle swarm optimization", IEEE, 1995, pp. 1942-1948.*

Al-Duwaish et al. "Use of multilayer feedforward neural networks in identification and control of wiener model", IEEE, 1996, pp. 255-258.*

Nelles et al. "Identification of non-linear dynamic systems-Classical methods versus radial basis function networks", Proceedings of the american control conference, 1996, pp. 3786-3790.*

Naitali et al. "Hammerstein and Wiener nonlinear models identification using multimodal particel swarm optimizer" Proceedings of the 2006 American control conference, 2006, pp. 2363-2368.*

Van Overschee et al. "N4SID: Subspace algorithms for the identification of combined deterministic-stochastic systems", Automatica, special issue on statistical processing and control, 1992, pp. 1-50.*

Giri et al. "Hammerstein model identification" Proceedings fof the 10th mediterranean conference on control and automation, 2002, 9 pages.*

Gomez et al. "Subspace identification of multivariable hammerstein and wiener models", IFAC, 2002, 6 pages.*

S.Z. Rizvi and H.N. Al-Duwaish, "A PSO-Subspace Algorithm for Identification of Hammerstein Models", presented at IFAC CAO'09 Workshop, May 8, 2009.

* cited by examiner

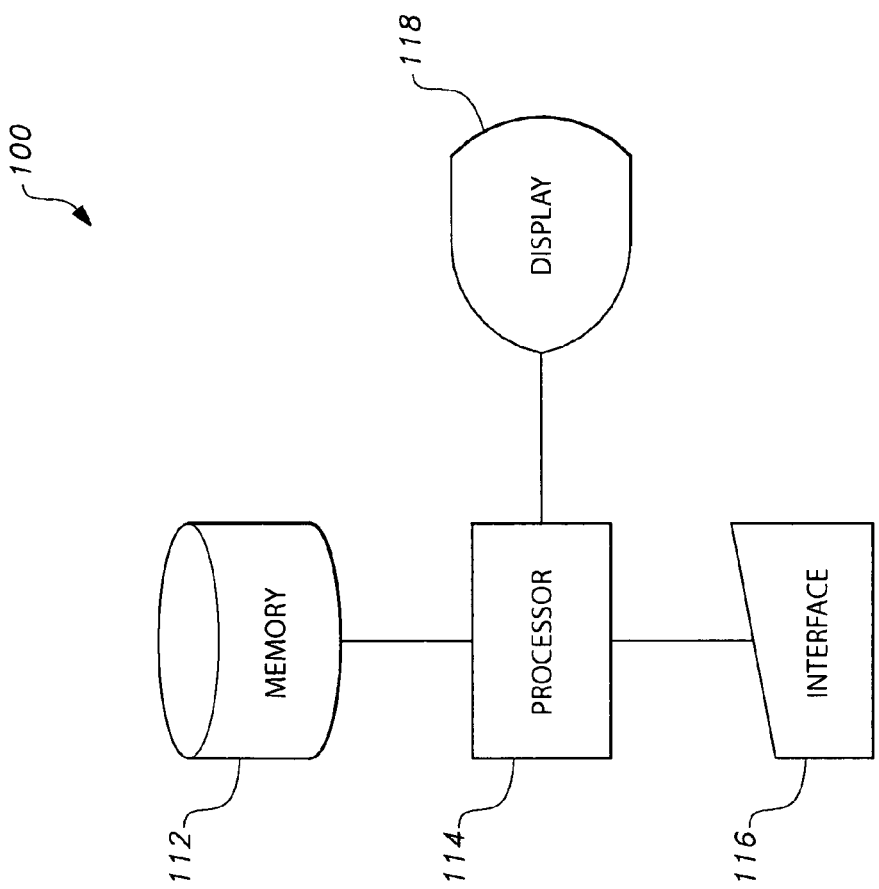

METHOD FOR IDENTIFYING HAMMERSTEIN MODELS

BACKGROUND OF THE INVENTION

1. Field of the Invention

The present invention relates to numerical modeling techniques used in engineering, and particularly to a computerized method for identifying Hammerstein models in which the linear dynamic part is modeled by a space-state model and the static nonlinear part is modeled using a radial basis function neural network (RBFNN), and in which a particle swarm optimization (PSO) algorithm is used to estimate the neural network parameters and a numerical algorithm for subspace state-space system identification (N4SID) is used for estimation of parameters for the linear part.

2. Description of the Related Art

The Hammerstein Model belongs to a family of block-oriented models, and is made up of a memoryless nonlinear part followed by a linear dynamic part. It has been known to effectively represent and approximate several industrial processes, such as pH neutralization processes, distillation column processes, and heat exchange processes. Hammerstein models have also been used to successfully model nonlinear filters, biological systems, water heaters, and electrical drives.

A significant amount of research has been carried out on identification of Hammerstein models. Systems can be modeled by employing either nonparametric or parametric models. Nonparametric representations involve kernel regression or expansion of series, such as the Volterra series. This results in a theoretically infinite number of model parameters, and is therefore represented in terms of curves, such as step responses or bode diagrams. Parametric representations, such as state-space models, are more compact, as they have fewer parameters and the nonlinearity is expressed as a linear combination of finite and known functions.

Development of nonlinear models is the critical step in the application of nonlinear model-based control strategies. Nonlinear behavior is prominent in the dynamic behavior of physical systems. Most physical devices have nonlinear characteristics outside a limited linear range. In most chemical processes, for example, understanding the nonlinear characteristics is important for designing controllers that regulate the process. It is rather difficult, yet necessary, to select a reasonable structure for the nonlinear model to capture the process nonlinearities. The nonlinear model used for control purposes should be as simple as possible, warranting minimal computational load and, at the same time, retaining most of the nonlinear dynamic characteristics of the system.

Many model structures have been proposed for the identification of nonlinear systems. The nonlinear static block followed by a dynamic block in the Hammerstein structure has been found to be a simple and effective representation for capturing the dynamics of typical of such chemical engineering processes as distillation columns and heat exchangers, for example. Nonlinear system identification involves the following tasks: structure selection, including selection of suitable nonlinear model structures and the number of model parameters; input sequence design, including the determination of the input sequence u(t), which is injected into the system to generate the output sequence y(t); noise modeling, which includes the determination of the dynamic model that generates the noise input w(t); parameter estimation, which includes estimation of the remaining model parameters from the dynamic system data u(t) and y(t), and the noise input w(t); and model validation, including the comparison of system data and model predictions for data not used in model development.

Many different techniques have been proposed for the black-box estimation of Hammerstein systems from input-output measurements. These techniques mainly differ in the way that static nonlinearity is represented and in the type of optimization problem that is finally obtained. In parametric approaches, the static nonlinearity is expressed in a finite number of parameters. Both iterative and non-iterative methods have been used for determination of the parameters of the static-nonlinear and linear-dynamic parts of the model. Typical techniques, however, are extremely costly in terms of computational time and energy. Thus, a method for identifying Hammerstein models solving the aforementioned problems is desired.

SUMMARY OF THE INVENTION

The identification of Hammerstein models relates to a computerized method for identifying Hammerstein models in which the linear dynamic part is modeled by a space-state model and the static nonlinear part is modeled using a radial basis function neural network (RBFNN), and in which a particle swarm optimization (PSO) algorithm is used to estimate the neural network parameters and a numerical algorithm for subspace state-space system identification (N4SID) is used for estimation of parameters for the linear part.

Accurate identification of a Hammerstein model requires that output error between the actual and estimated systems be minimized; thus, the problem of identification is, in essence, an optimization problem. The PSO-subspace algorithm is an optimization algorithm. Particle swarm optimization (PSO), typically known for its heuristic search capabilities, is used for estimating the parameters of the RBFNN. Parameters of the linear part are estimated using a numerical algorithm for subspace state-space system identification (N4SID).

The method includes the steps of: (a) acquiring an initial set of nonlinear data from a plant; (b) estimating a set of state-space matrices A, B, C and D from the initial set of nonlinear data acquired from the plant using subspace identification; (c) initializing a particle swarm optimization method with a random population of possible radial basis function neural network weights; (d) calculating a global best set of weights that minimizes an output error measure; (e) estimating a set of radial basis function neural network outputs υ based upon the global best set of weights; (f) estimating the state-space matrices A, B, C and D from the radial basis function neural network outputs υ estmiated in step (e) and a set of original system outputs y; (h) calculating a set of system outputs ŷ from the estimated state-space matrices A, B, C and D step (f); (i) calculating the output error measure; and (j) repeating steps (c) to (i) if the calculated output error measure is greater than a preselected threshhold error measure.

These and other features of the present invention will become readily apparent upon further review of the following specification and drawings.

BRIEF DESCRIPTION OF THE DRAWINGS

FIG. 10 is a block diagram of a representative computer system for implementing the method for identifying Hammerstein models according to the present invention.

Similar reference characters denote corresponding features consistently throughout the attached drawings.

DETAILED DESCRIPTION OF THE PREFERRED EMBODIMENTS

The method for identifying Hammerstein models is a computerized method for identifying Hammerstein models in which the linear dynamic part is modeled by a space-state model and the static nonlinear part is modeled using a radial basis function neural network (RBFNN), and in which a particle swarm optimization (PSO) algorithm is used to estimate the neural network parameters and a numerical algorithm for subspace state-space system identification (N4SID) is used for estimation of parameters for the linear part.

Accurate identification of a Hammerstein model requires that output error between the actual and estimated systems be minimized; thus, the problem of identification is, in essence, an optimization problem. The PSO-subspace algorithm is an optimization algorithm. Particle swarm optimization (PSO), typically known for its heuristic search capabilities, is used for estimating the parameters of the RBFNN. Parameters of the linear part are estimated using a numerical algorithm for subspace state-space system identification (N4SID).

Figure 2:
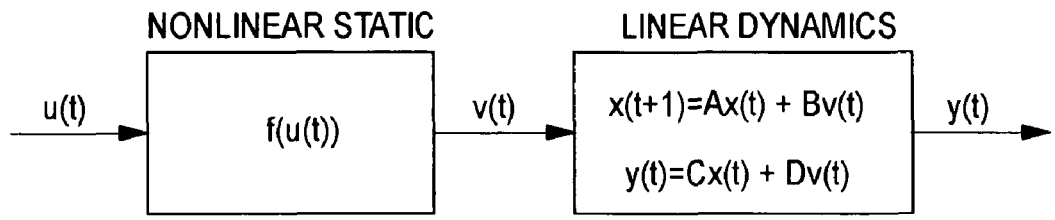
FIG. 2 is a block diagram of the Hammerstein model for numerical analysis.

As noted above, the linear dynamic part of the Hammerstein model is modeled by a state-space model. The static nonlinear part of the Hammerstein model is modeled using RBFNN. The external inputs to the system u(t) are fed to the RBFNN, as best illustrated in FIG. 2. The output generated by RBFNN, v(t) acts as the input to the state-space system, which translates the inputs to system outputs y(t). The intermediate data between the non-linear and linear parts is inaccessible to measurements.

The equations for a discrete time state-space representation are given by:

$$x(t+1)=Ax(t)+Bu(t)+w(t) \quad (1)$$

$$y(t)=Cx(t)+Du(t)+z(t) \quad (2)$$

where u(t) and y(t) are input and output of the system observed at discrete time instant t, respectively, z(t) is the measurement noise and w(t) is the process noise.

In order to update the parameters of the model (with a goal of minimizing the output error measure), the output error measure is calculated as:

$$I = \sum_{t=1}^{N} e^2(t) = \sum_{t=1}^{N} (y(t) - \hat{y}(t))^2 \quad (3)$$

where I is the cost index and $\hat{y}$ is the output of the estimated model.

Figure 3:
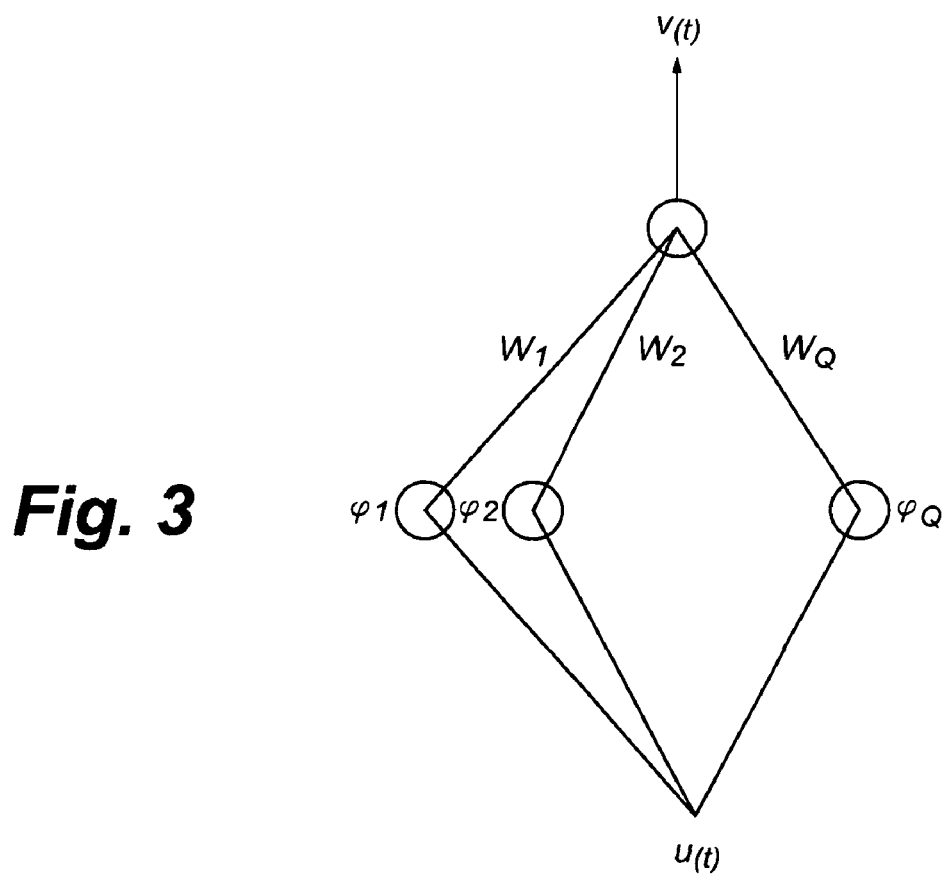
FIG. 3 is a diagrammatic view of a three-layer radial basis function neural network (RBFNN).

RBFNN is an effective type of neural network that has proved useful in applications such as function approximation and pattern recognition. FIG. 3 illustrates an RBFNN with three layers having Q neurons in the hidden layer. The input layer connects the network to its environment. The second layer performs a fixed nonlinear transformation using basis functions. The output layer linearly weighs the response of the network to the output. Thus, the only adjustable parameters are the weights of this layer.

RBFNN output is given as:

$$v(t) = \sum_{i=1}^{Q} w_i \phi \|u(t) - c_i\| \quad (4)$$

where $c_i$ is the center for the $i^{th}$ neuron, Q is the number of neurons in the hidden layer, $w_i$ is the weight connecting the $i^{th}$ neuron node to the output layer, $\phi$ is the radial basis function, and $\|.\|$ denotes the norm.

Subspace identification is used for estimating the parameters of the linear dynamic part of the model; i.e., the matrices of the state-space model. The present inventive method makes use of the N4SID numerical algorithm. The objective of the algorithm is to determine the order n of the system, and the system matrices A, B, C, and D without any prior knowledge of the structure of the system. This is achieved in two main steps: First, model order n and a Kalman filter state sequence of estimates $\hat{x}_i, \hat{x}_{i+1}, \ldots, \hat{x}_{i+j}$ are determined by projecting row spaces of data block Hankel matrices, and then applying a singular value decomposition. Next, the solution of a least squares problem is used to obtain the state space matrices A, B, C, and D.

PSO is a heuristic search-based optimzation technique which exhibits behavior of swarm intelligence. PSO differs from other evolutionary algorithms (EAs) in that it changes its population from one iteration to the next. Unlike genetic algorithms (GAs) and other EAs, operators like selection, mutation and crossover are not used to change the population. Existing particles are, instead, modified according to a pair of formulae. PSO thus differs from other EAs in terms of performance. PSO is more robust and faster in comparison, and also provides solutions to complex and nonlinear problems, with relative ease in finding a global minimum. The convergence characteristic of PSO is relatively stable and provides solutions in relatively little time.

PSO begins with a population of particles. Each particle adjusts its position according to its own experience, as well as by the experience of neighboring particles. Each particle is treated as a point in D-dimensional space. The $i^{th}$ particle is represented as:

$$X_i = (x_{i1}, x_{i2}, \ldots, x_{iD}) \quad (5)$$

and the best positions of the particles (the position giving the most optimum solution) are recorded as:

$$P_i=(p_{i1},p_{i2},\ldots,p_{iD}) \quad (6)$$

with the change in position (velocity) of each particle being given as:

$$V_i=(v_{i1},v_{i2},\ldots,v_{iD}) \quad (7)$$

where the velocity and positions of the particles are updated according to the following pair of equations:

$$V_i^{n+1}=w*V_i^n+c_1*r_{i1}^{n}*(P_i^n-X_i^n)+c_2*r_{i2}^{n}*(P_g^n-X_i^n) \quad (8)$$

$$X_i^{n+1}=X_i^n+x*V_i^{n+1} \quad (9)$$

where w is the inertial weight parameter that is used to limit the velocity and facilitate better convergence. $c_1$ and $c_2$ are two positive real constants, the cognitive parameter and the social parameter, respectively. The value of $c_1$ signifies how much a particle trusts its past experiences, and how much it searches for solutions around the local best position, while the value of $c_2$ determines the swarm's attraction toward a global best position.

Higher values of $c_1$ and $c_2$ make the swarm able to react faster to changes, whereas lower values of these parameters make the swarm slower in changing neighborhoods of solutions. The method makes use of values such that $c_1 \geq c_2$, and $c_1+c_2 \leq 4$.

The method relates to Hammerstein model identification, which, in essence, can be summarized as follows: Given a set of N noisy inputs $u(t)_{t=0}^{N-1}$ and outputs $y(t)_{t=0}^{N-1}$, find the weights of the RBFNN; and find the matrices of the state space model. Since the output y(t) is nonlinear in relation to the input u(t), the calculations are nontrivial. Thus, a recursive algorithm is utilized to update the weights of the neural network for each set of input and output data.

Figure 1:
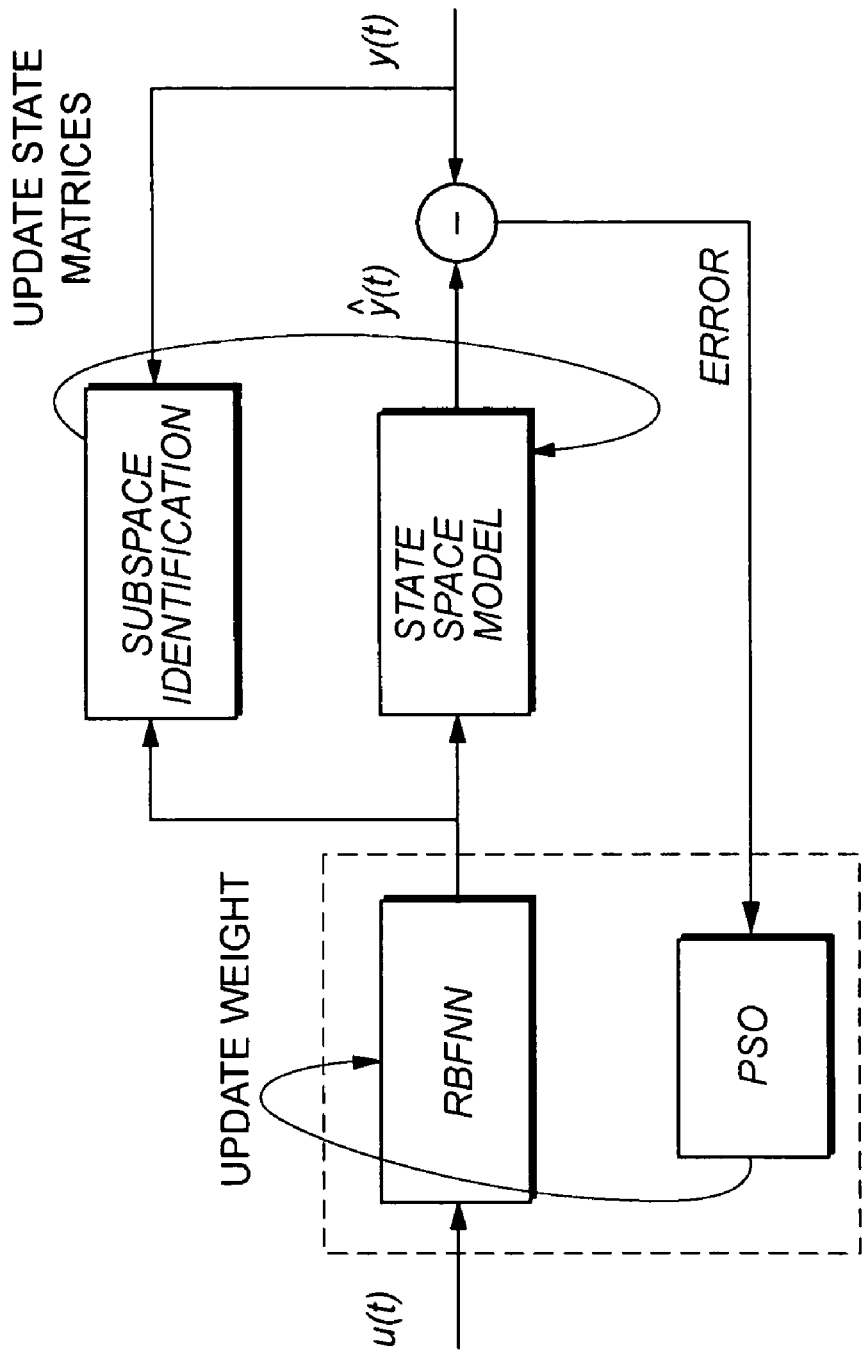
FIG. 1 is a block diagram of a method for identifying Hammerstein models according to the present invention.

As illustrated in FIG. 1, the method includes the following steps: (1) estimation of state-space matrices A, B, C and D from original nonlinear data using subspace identification (i.e., an initial estimate); (2) initialization of PSO with random population of possible RBFNN weights; (3) obtaining a global best set of weights that minimizes the cost index given in equation 3; (4) estimation of RNFNN outputs v once optimum weights are obtained; (5) estimation of state-space matrices A, B, C and D from the new set of neural network outputs v and original system outputs y (this estimate of the state-space model is an improvement on the previous estimate); (6) regeneration of output ŷ from the new estimate of the complete system; and (7) repetition of steps (2) to (6) if the minimum goal for cost is not reached.

EXAMPLE 1

Figure 4:
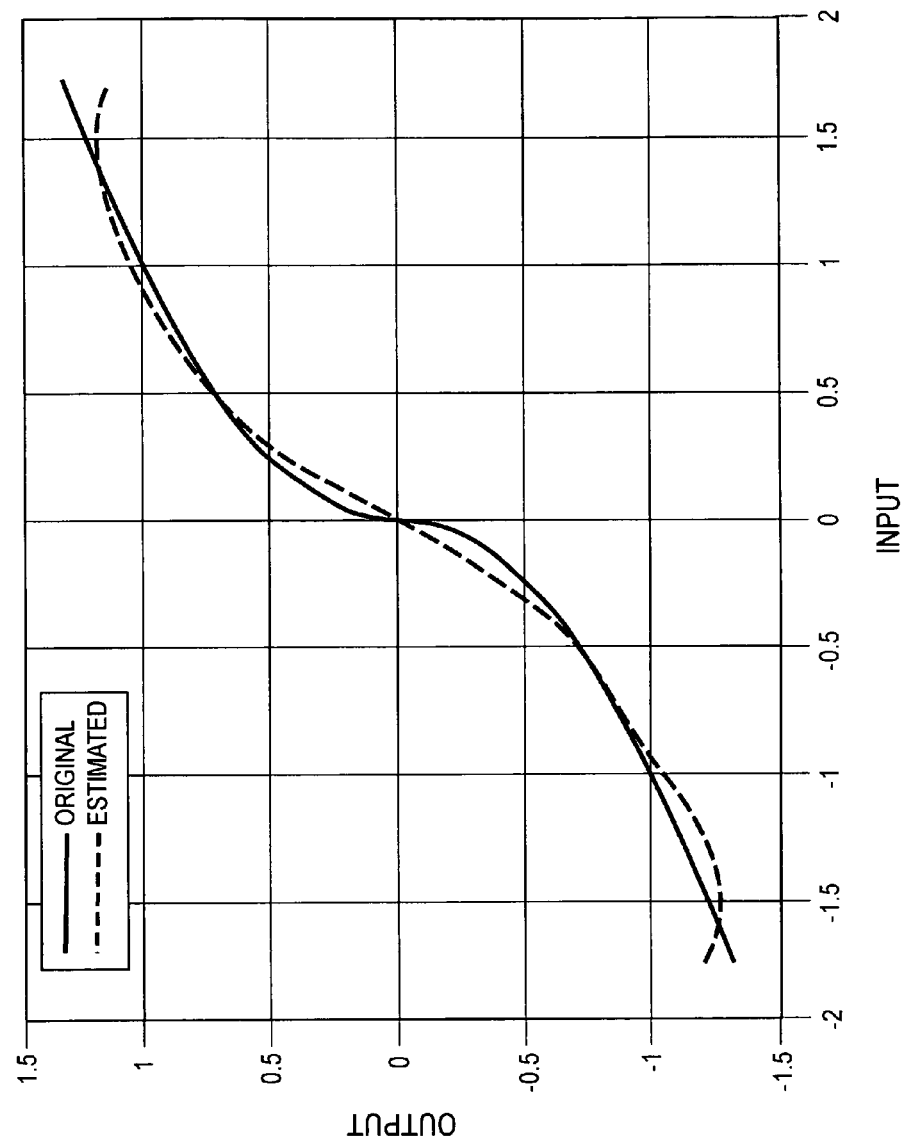
FIG. 4 is a graph showing an estimate of nonlinearity for a first example of applying the method for identifying Hammerstein models according to the present invention in which the static nonlinear portion is given by equation 10.
Figure 5:
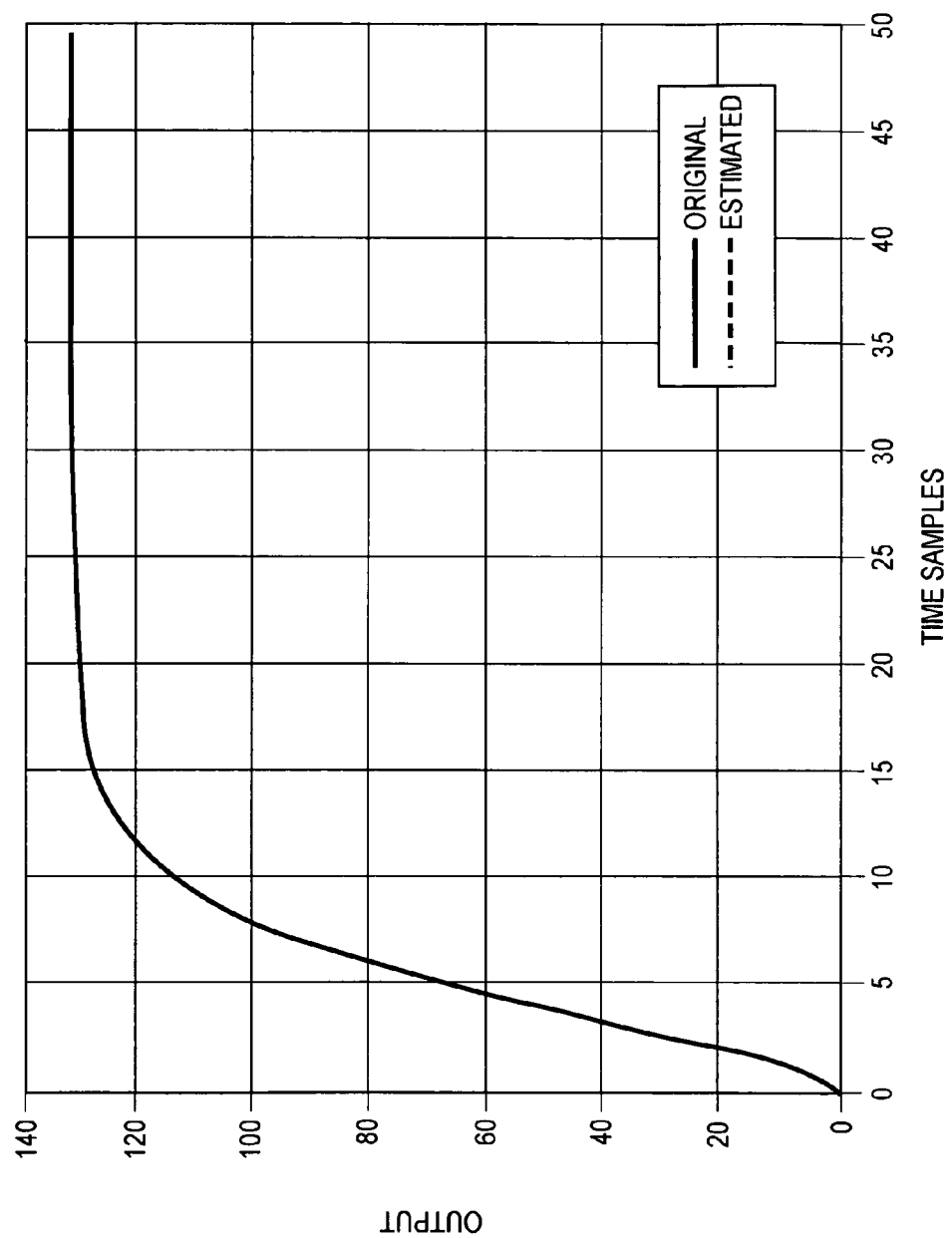
FIG. 5 is a graph showing the step response of the linear dynamic portion for the first example of applying the method for identifying Hammerstein models according to the present invention in which the dynamic linear portion is represented by equations 11 and 12.
Figure 6:
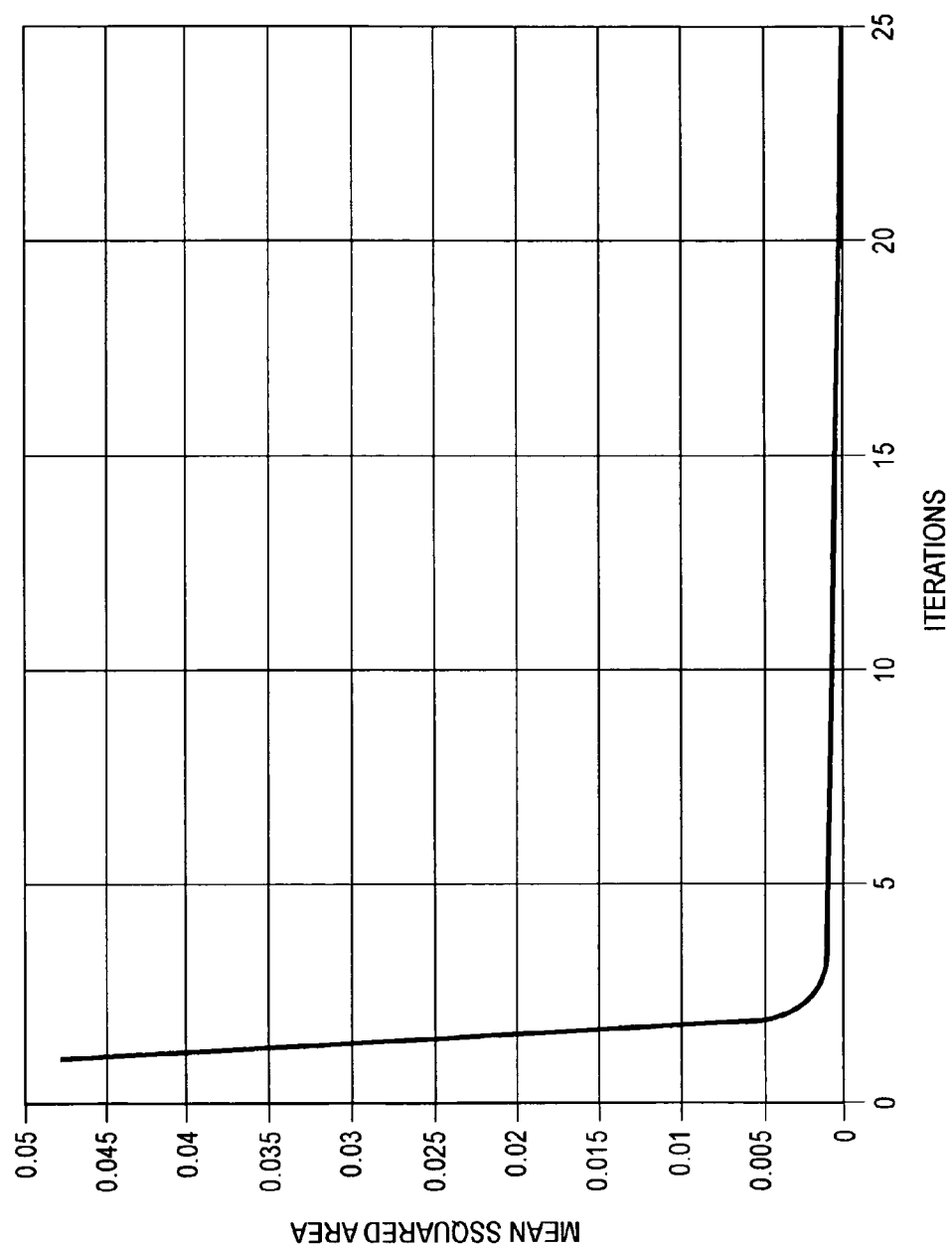
FIG. 6 is a graph showing the mean squared error for the example of FIGS. 4 and 5 in applying the method for identifying Hammerstein models according to the present invention.

In a first example of the method, the Hammerstein type nonlinear process includes a static nonlinearity given by:

$$v(t)=\sin(u(t))\sqrt{|u(t)|} \quad (10)$$

with the dynamic linear part being given by a third-order discrete time state-space system:

$$\begin{bmatrix} x_1(t+1) \\ x_2(t+1) \\ x_3(t+1) \end{bmatrix} = \begin{bmatrix} 1.80 & 1 & 0 \\ -1.07 & 0 & 1 \\ 0.21 & 0 & 0 \end{bmatrix} \begin{bmatrix} x_1(t) \\ x_2(t) \\ x_3(t) \end{bmatrix} + \begin{bmatrix} 4.80 \\ 1.93 \\ 1.21 \end{bmatrix} v(t) \quad (11)$$

$$y(t) = \begin{bmatrix} 1 & 0 & 0 \end{bmatrix} \begin{bmatrix} x_1(t) \\ x_2(t) \\ x_3(t) \end{bmatrix} \quad (12)$$

where, for this example, an RBF network of ten neurons is initialized with centers evenly distributed in the interval [−1.75, 1.75]. The method provides accurate results with a mean squared output error converging to a final value of $4 \times 10^{-4}$. FIG. 4 shows that the shape of the nonlinearity has been accurately estimated, and FIG. 5 shows the step response of the dynamic linear part. Convergence of mean squared error is shown in FIG. 6.

EXAMPLE 2

Figure 7:
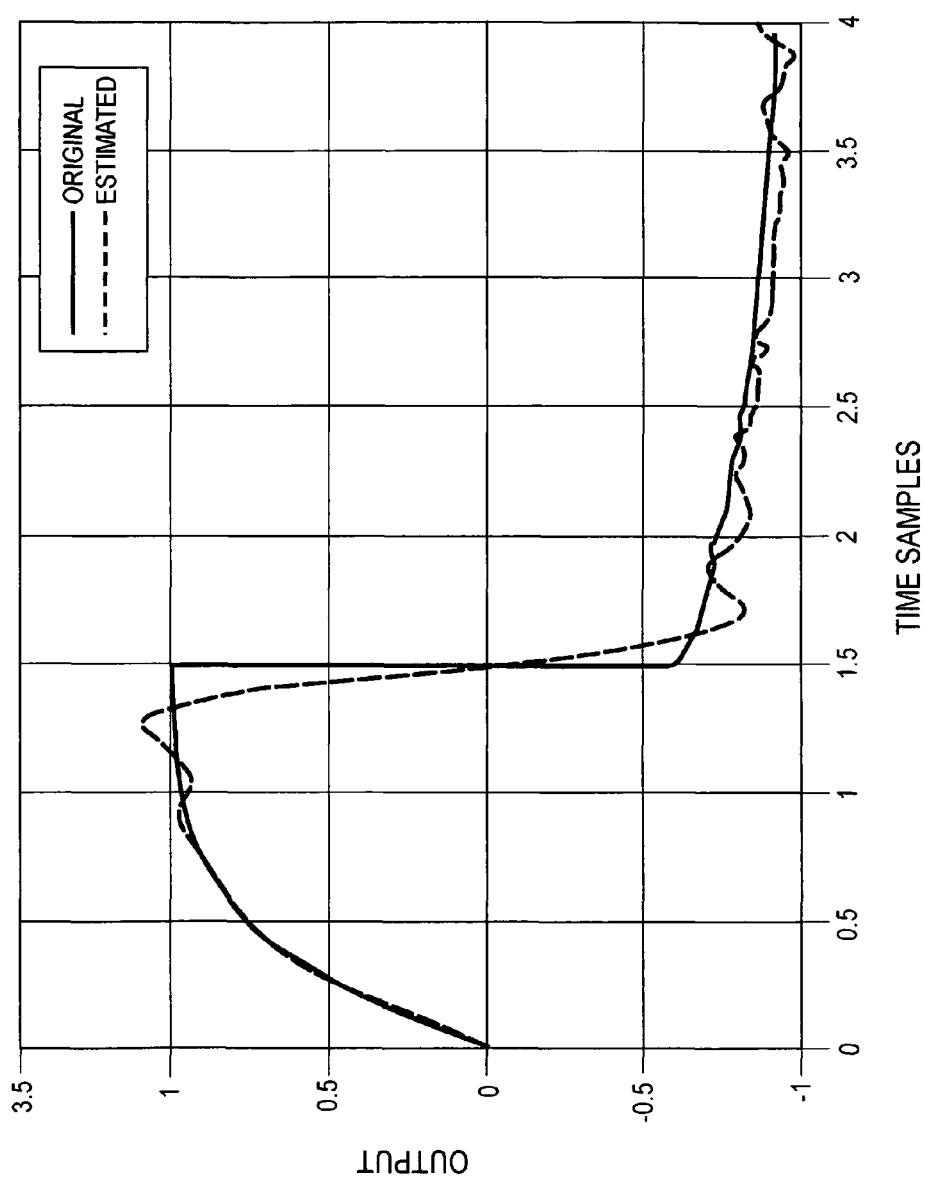
FIG. 7 is a graph showing an estimate of nonlinearity for a second example of applying the method for identifying Hammerstein models according to the present invention in which the static nonlinear portion is given by equations 13 and 14.
Figure 8:
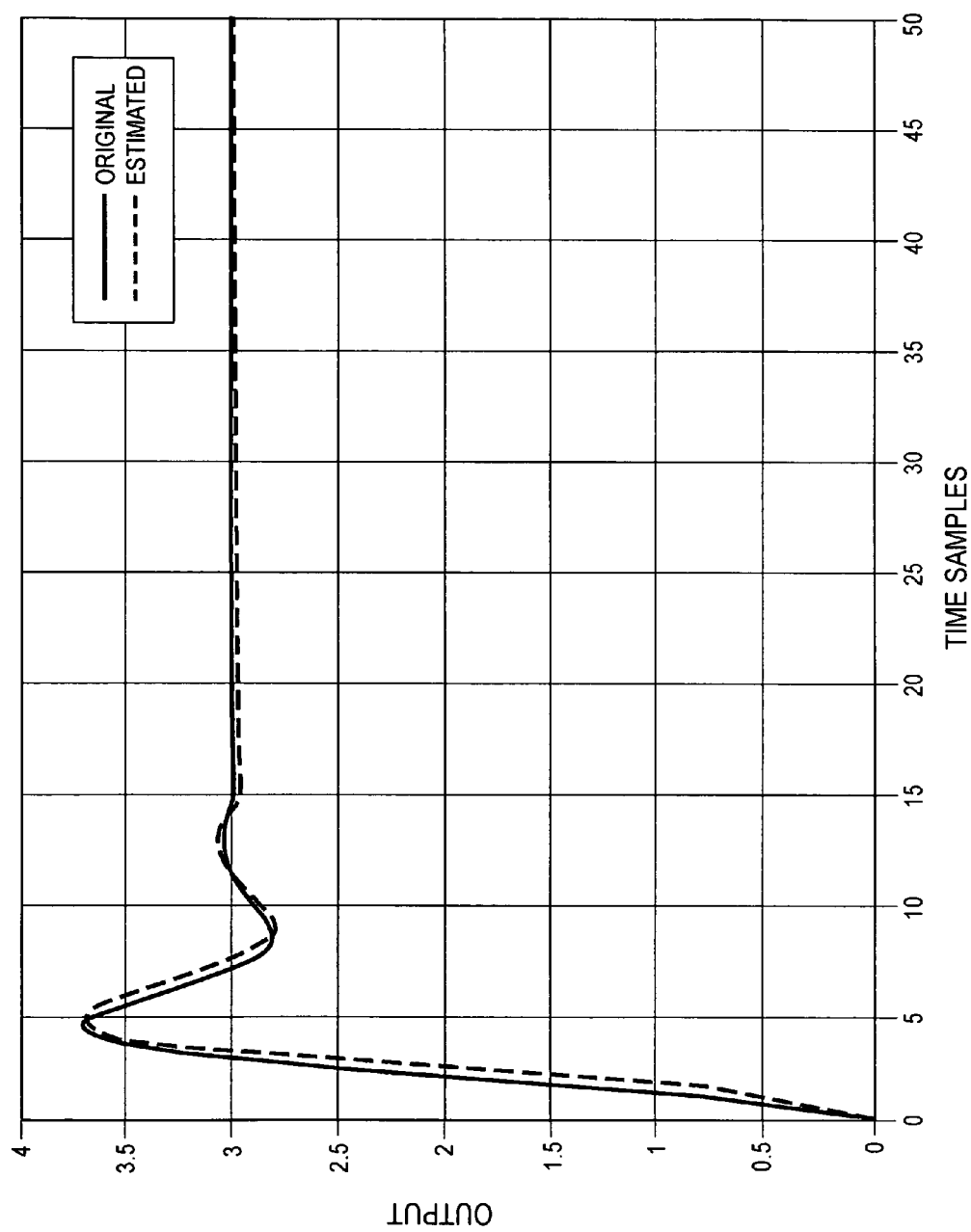
FIG. 8 is a graph showing the step response of the linear dynamic portion for the second example of applying the method for identifying Hammerstein models according to the present invention in which the dynamic linear portion is represented by the equations 15.
Figure 9:
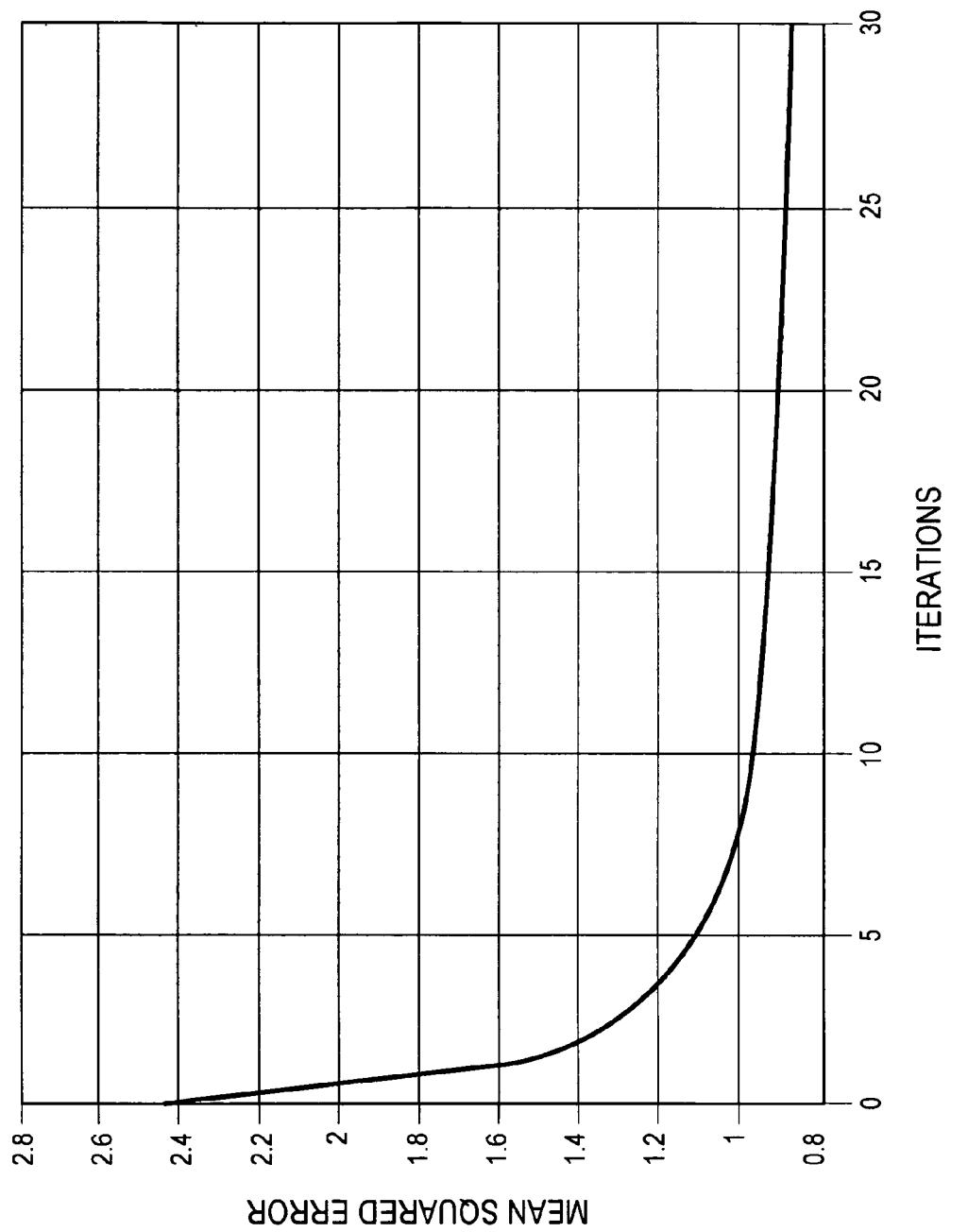
FIG. 9 is a graph showing the mean squared error for the example of FIGS. 7 and 8 in applying the method for identifying Hammerstein models according to the present invention.

In a second example, the Hammerstein type nonlinear process includes a static nonlinearity given by:

$$v(t) = \tanh[2u(t)] \quad (13)$$
$$1.5 \geq u(t)$$

$$v(t) = \frac{\exp(u(t))-1}{\exp(u(t))+1} \quad (14)$$
$$4 > u(t) > 1.5$$

with the dynamic linear part being given by the following second-order discrete time state-space system:

$$\begin{bmatrix} x_1(t+1) \\ x_2(t+1) \end{bmatrix} = \begin{bmatrix} 1 & 1 \\ -0.5 & 0 \end{bmatrix} \begin{bmatrix} x_1(t) \\ x_2(t) \end{bmatrix} + \begin{bmatrix} 1 \\ 0.5 \end{bmatrix} v(t) \quad (15)$$

$$y(t) = \begin{bmatrix} 1 & 0 \end{bmatrix} \begin{bmatrix} x_1(t) \\ x_2(t) \end{bmatrix}$$

where, for this example, an RBF network with 15 neurons is initialized, and evenly distributed centers are chosen in the interval [0, 4]. The method performs efficiently and, after twenty iterations, the mean squared error converges to a final value of $8 \times 10^{-4}$. The estimates of nonlinearity and step response of the linear part are shown respectively in FIGS. 7 and 8. The squared error plot is shown in FIG. 9.

The simulation results given above show that the PSO-subspace method performs well in estimating the shape of the nonlinearities. Eigenvalues of the linear dynamic subsystems are shown below in Table I.

TABLE I

| | Eigenvalues of linear subsystem | | |
|---|---|---|---|
| | $\lambda_1$ | $\lambda_2$ | $\lambda_3$ |
| Example 1 (original) | 0.7 | 0.6 | 0.5 |
| Example 1 (estimated) | 0.6811 | 0.6481 | 0.4639 |
| Example 2 (original) | 0.5 + 0.5i | 0.5 − 0.5i | |
| Example 2 (estimated) | 0.497 + 0.5i | 0.497 − 0.5i | |

The values of Table I show that the linear parts of the Hammerstein models have also been closely identified in both the examples. The method combines the advantages of PSO with those of state-space models. PSO is well known to outperform other EAs in finding global optima, and state-space models can more easily be extended to systems with multiple inputs and outputs, as compared to polynomial models.

In the above, the calculations may be performed by any suitable computer system, such as that diagrammatically shown in FIG. 10. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

It is to be understood that the present invention is not limited to the embodiments described above, but encompasses any and all embodiments within the scope of the following claims.

We claim:

1. A computerized method for identifying Hammerstein models, comprising the steps of:
    (a) estimating a set of state-space matrices A, B, C and D from an initial set of nonlinear data acquired from a plant using subspace identification;
    (b) initializing a swarm of particles with a random population of possible radial basis function neural network weights;
    (c) calculating a global best set of weights that minimizes an output error measure;
    (d) estimating a set of radial basis function neural network outputs v based upon the global best set of weights;
    (e) estimating the state-space matrices A, B, C and D from the radial basis function neural network outputs v estimated in step (d) and a set of original system outputs y, wherein the set of state-space matrices are estimated by calculating $x(t+1)=Ax(t)+Bu(t)+w(t)$ and $y(t)=Cx(t)+Du(t)+z(t)$, wherein $u(t)$ represents an input of the Hammerstein system and $y(t)$ represents an output of the Hammerstein system observed at a discrete time instant t, $z(t)$ represents measurement noise, and $w(t)$ represents process noise;
    (f) calculating a set of system outputs $\hat{y}$ from the estimated state-space matrices A, B, C and D of step (e);
    (g) calculating the output error measure I as $$I = \sum_{t=1}^{N} (y(t) - \hat{y}(t))^2,$$

wherein N represents a number of data points; and
    (h) repeating steps (b) to (g) if the calculated output error measure is greater than a preselected threshold error measure.

2. The method for identifying Hammerstein models as recited in claim 1, wherein the radial basis function neural network outputs are calculated as $$v(t) = \sum_{i=1}^{Q} w_i \phi \|u(t) - c_i\|,$$

wherein $c_i$ represents a center for an $i^{th}$ neuron, wherein i is an integer, Q represents a number of neurons in a hidden layer of the neural network, $w_i$ represents a weight connecting the $i^{th}$ neuron node to an output layer, and $\phi$ represents a radial basis function.

3. The method for identifying Hammerstein models as recited in claim 2, wherein the particle swarm optimization method includes establishing a set of particles and identifying each particle in the set as a point in D-dimensional space, wherein the $i^{th}$ particle is represented as $X_i=(x_{i1}, x_{i2}, \ldots, x_{iD})$ and the most optimal positions of the particles are given by $P_i=(p_{i1}, p_{i2}, \ldots, p_{iD})$, with a change in velocity of each of the particles being given by $V_i=(v_{i1}, v_{i2}, \ldots, v_{iD})$, such that the velocity and position of each particle is updated as $V_i^{n+1}=w*V_i^n+c_1*r_{i1}^n*(P_i^n-X_i^n)+c_2*r_{i2}^n*(P_g^n-X_i^n)$ and $X_i^{n+1}=X_i^n+x*V_i^{n+1}$, wherein w is an inertial weight parameter for limiting velocity, and $c_1$ and $c_2$, represent a cognitive parameter and a social parameter, respectively.

4. A system for identifying Hammerstein models, comprising:
    a processor;
    computer readable memory coupled to the processor;
    a user interface coupled to the processor;
    a display coupled to the processor
    software stored in the memory and executable by the processor, the software having:
        means for estimating a set of state-space matrices A, B, C and D from an initial set of nonlinear data acquired from a plant using subspace identification;
        means for initializing a swarm of particles with a random population of possible radial basis function neural network weights;
        means for calculating a global best set of weights which minimizes an output error measure;
        means for estimating a set of radial basis function neural network outputs v based upon the global best set of weights;
        means for estimating the state-space matrices A, B, C and D from the estimated radial basis function neural network outputs v and a set of original system outputs y, wherein the set of state-space matrices are estimated by calculating $x(t+1)=Ax(t)+Bu(t)+w(t)$ and $y(t)=Cx(t)+Du(t)+(t)$, wherein $u(t)$ represents an input of the Hammerstein system and $y(t)$ represents an output of the Hammerstein system observed at a discrete time instant t, $z(t)$ represents measurement noise, and $w(t)$ represents process noise;
        means for calculating a set of system outputs $\hat{y}$ from the estimated state-space matrices A, B, C and D; and
        means for calculating the output error measure I as $$I = \sum_{t=1}^{N} (y(t) - \hat{y}(t))^2,$$

wherein N represents a number of data points.

5. A computer software product that includes a non-transitory storage medium readable by a processor, the non-transitory storage medium having stored thereon a set of instructions for identifying Hammerstein models, the instructions comprising:
    (a) a first sequence of instructions which, when executed by the processor, causes the processor to acquire an initial set of nonlinear data from a plant;
    b) a second sequence of instructions which, when executed by the processor, causes the processor to estimate a set of state-space matrices A, B, C and D from the initial set of nonlinear data acquired from the plant using subspace identification;

c) a third sequence of instructions which, when executed by the processor, causes the processor to initialize a swarm of particles with a random population of possible radial basis function neural network weights;

d) a fourth sequence of instructions which, when executed by the processor, causes the processor to calculate a global best set of weights which minimizes an output error measure;

e) a fifth sequence of instructions which, when executed by the processor, causes the processor to estimate a set of radial basis function neural network outputs v based upon the global best set of weights;

f) a sixth sequence of instructions which, when executed by the processor, causes the processor to estimate the state-space matrices A, B, C and D from the radial basis function neural network outputs v estimated in the fifth sequence of instructions and a set of original system outputs y, wherein the set of state-space matrices are estimated by calculating $x(t+1)=Ax(t)+Bu(t)+w(t)$ and $y(t)=Cx(t)+Du(t)+z(t)$, wherein u(t) represents an input of the Hammerstein system and y(t) represents an output of the Hammerstein system observed at a discrete time instant t, z(t) represents measurement noise, and w(t) represents process noise;

g) a seventh sequence of instructions which, when executed by the processor, causes the processor to calculate a set of system outputs ŷ from the estimated state-space matrices A, B, C and D of the sixth sequence of instructions;

h) an eighth sequence of instructions which, when executed by the processor, causes the processor to calculate the output error measure I as $$I = \sum_{t=1}^{N} (y(t) - \hat{y}(t))^2,$$

wherein N represents a number of data points; and i) a ninth sequence of instructions which, when executed by the processor, causes the processor to repeat the third sequence of instructions fo the eighth sequence of instructions if the calculated output error measure is greater than a pre-selected threshhold error measure.

* * * * *